US008580950B2

(12) United States Patent
Lu et al.

(10) Patent No.: US 8,580,950 B2
(45) Date of Patent: *Nov. 12, 2013

(54) ALDEHYDE-FUNCTIONALIZED POLYSACCHARIDES

(75) Inventors: Helen S. M. Lu, Wallingford, PA (US); Steven W. Shuey, Chadds Ford, PA (US)

(73) Assignee: Actamax Surgical Materials, LLC, Berkeley, CA (US)

( * ) Notice: Subject to any disclaimer, the term of this patent is extended or adjusted under 35 U.S.C. 154(b) by 303 days.

This patent is subject to a terminal disclaimer.

(21) Appl. No.: 12/973,967

(22) Filed: Dec. 21, 2010

(65) Prior Publication Data

US 2012/0142787 A1 Jun. 7, 2012

Related U.S. Application Data

(63) Continuation-in-part of application No. 12/996,477, filed as application No. PCT/US2010/040702 on Jul. 1, 2010.

(60) Provisional application No. 61/222,725, filed on Jul. 2, 2009.

(51) Int. Cl.
*C08B 1/00* (2006.01)
*C08L 1/02* (2006.01)
*C08L 1/28* (2006.01)
*C08L 5/02* (2006.01)
*C08L 5/08* (2006.01)
*C08L 5/12* (2006.01)
*C08B 11/02* (2006.01)
*C08B 11/04* (2006.01)
*C08B 11/08* (2006.01)
*C08B 11/12* (2006.01)
*C08B 31/18* (2006.01)
*C08B 37/02* (2006.01)
*C08B 37/12* (2006.01)
*C08B 37/18* (2006.01)

(52) U.S. Cl.
USPC ........... 536/112; 536/55.1; 536/55.2; 536/56; 536/84; 536/96; 536/97; 536/98; 536/104; 536/105; 536/123.12; 514/54; 514/57; 514/59; 514/60

(58) Field of Classification Search
None
See application file for complete search history.

(56) References Cited

U.S. PATENT DOCUMENTS

| 4,584,188 A | 4/1986 | Graham |
| 4,703,116 A | 10/1987 | Solarek et al. |
| 4,731,162 A | 3/1988 | Solarek et al. |
| 4,741,804 A | 5/1988 | Solarek et al. |
| 4,749,800 A | 6/1988 | Jobe et al. |
| 4,766,245 A | 8/1988 | Larkin et al. |
| 5,092,883 A | 3/1992 | Eppley et al. |
| 5,116,824 A | 5/1992 | Miyata et al. |
| 5,162,430 A | 11/1992 | Rhee et al. |
| 5,196,441 A | 3/1993 | Kunisch et al. |
| 5,275,838 A | 1/1994 | Merrill |
| 5,292,802 A | 3/1994 | Rhee et al. |
| 5,308,889 A | 5/1994 | Rhee et al. |
| 5,324,775 A | 6/1994 | Rhee et al. |
| 5,328,995 A | 7/1994 | Schaulin et al. |
| 5,451,398 A | 9/1995 | Vigh |
| 5,502,042 A | 3/1996 | Gruskin et al. |
| 5,505,952 A | 4/1996 | Jiang et al. |
| 5,514,379 A | 5/1996 | Weissleder et al. |
| 5,567,685 A | 10/1996 | Linden et al. |
| 5,643,575 A | 7/1997 | Martinez et al. |
| 5,733,563 A | 3/1998 | Fortier |
| 5,830,986 A | 11/1998 | Merrill et al. |
| 5,840,698 A | 11/1998 | Campbell et al. |
| 5,843,865 A | 12/1998 | Del Corral et al. |
| 5,874,500 A | 2/1999 | Rhee et al. |
| 6,051,648 A | 4/2000 | Rhee et al. |
| 6,121,375 A | 9/2000 | Eknoian |
| 6,150,472 A | 11/2000 | Engbers |
| 6,165,488 A | 12/2000 | Tardy et al. |
| 6,166,130 A | 12/2000 | Rhee et al. |
| 6,323,278 B2 | 11/2001 | Rhee et al. |
| 6,391,939 B2 | 5/2002 | Tayot et al. |
| 6,410,519 B1 | 6/2002 | Gruskin et al. |
| 6,458,147 B1 | 10/2002 | Cruise et al. |
| 6,458,889 B1 | 10/2002 | Trollsas et al. |
| 6,465,694 B1 | 10/2002 | Baudys et al. |

(Continued)

FOREIGN PATENT DOCUMENTS

JP  1982-102932  6/1982
JP  1988-11167   1/1988

(Continued)

OTHER PUBLICATIONS

Thome, J., et al., "Ultrathin Antibacterial Polyammonium Coatings on Polymer Surfaces"; Surface and Coatings Technology, 174-175, 2003, pp. 584-587.

(Continued)

Primary Examiner — Leigh Maier
(74) Attorney, Agent, or Firm — McCarter & English

(57) ABSTRACT

Novel aldehyde-functionalized polysaccharide compositions containing pendant dialdehyde groups are described that are more stable in aqueous solution than oxidized polysaccharides. The aldehyde-functionalized polysaccharides may be reacted with various amine-containing polymers to form hydrogel tissue adhesives and sealants that may be useful for medical applications such as wound closure, supplementing or replacing sutures or staples in internal surgical procedures such as intestinal anastomosis and vascular anastomosis, tissue repair, preventing leakage of fluids such as blood, bile, gastrointestinal fluid and cerebrospinal fluid, ophthalmic procedures, drug delivery, and preventing post-surgical adhesions.

12 Claims, No Drawings

(56) References Cited

U.S. PATENT DOCUMENTS

| | | |
|---|---|---|
| 6,514,534 B1 | 2/2003 | Sawhney |
| 6,534,591 B2 | 3/2003 | Rhee et al. |
| 6,602,952 B1 | 8/2003 | Bentley et al. |
| 6,620,125 B1 | 9/2003 | Redl |
| 6,696,089 B2 | 2/2004 | Kabanov et al. |
| 6,703,047 B2 | 3/2004 | Sawhney et al. |
| 6,756,518 B2 | 6/2004 | Gruskin et al. |
| 6,800,278 B1 | 10/2004 | Perrault et al. |
| 6,833,408 B2 | 12/2004 | Sehl et al. |
| 6,858,736 B2 | 2/2005 | Chang-min et al. |
| 6,896,725 B2 | 5/2005 | Thornton et al. |
| 7,217,845 B2 | 5/2007 | Rosen et al. |
| 7,834,065 B2 | 11/2010 | Nakajima et al. |
| 7,960,498 B2 | 6/2011 | Chenault et al. |
| 2002/0151520 A1 | 10/2002 | Gruskin |
| 2003/0022216 A1 | 1/2003 | Mao et al. |
| 2003/0027788 A1 | 2/2003 | Singh et al. |
| 2003/0064502 A1 | 4/2003 | Illman et al. |
| 2003/0087111 A1 | 5/2003 | Hubbell et al. |
| 2003/0108511 A1 | 6/2003 | Sawhney |
| 2003/0119985 A1 | 6/2003 | Sehl et al. |
| 2004/0086479 A1 | 5/2004 | Grinstaff et al. |
| 2004/0096507 A1 | 5/2004 | Kwang et al. |
| 2004/0225097 A1 | 11/2004 | Nho et al. |
| 2004/0235708 A1 | 11/2004 | Rhee et al. |
| 2005/0002893 A1 | 1/2005 | Goldmann |
| 2005/0020805 A1 | 1/2005 | Sunkara et al. |
| 2005/0288684 A1 | 12/2005 | Aronson et al. |
| 2006/0078536 A1 | 4/2006 | Kodokian et al. |
| 2006/0115531 A1 | 6/2006 | Chenault |
| 2006/0193899 A1 | 8/2006 | Sawhney |
| 2006/0292030 A1 | 12/2006 | Odermatt et al. |
| 2007/0031467 A1 | 2/2007 | Abrahams et al. |
| 2007/0048251 A1 | 3/2007 | Arthur |
| 2007/0249870 A1 | 10/2007 | Chenault |
| 2008/0220047 A1 | 9/2008 | Sawhney et al. |
| 2008/0319101 A1 | 12/2008 | Nakajima et al. |
| 2009/0035249 A1 | 2/2009 | Bhatia et al. |
| 2009/0054535 A1 | 2/2009 | Figuly et al. |
| 2010/0086678 A1 | 4/2010 | Arthur et al. |
| 2010/0112063 A1 | 5/2010 | Figuly et al. |
| 2010/0272804 A1 | 10/2010 | Lu |
| 2011/0224724 A1 | 9/2011 | Lu et al. |
| 2011/0250257 A1 | 10/2011 | Arthur et al. |
| 2011/0269916 A1 | 11/2011 | Chenault et al. |

FOREIGN PATENT DOCUMENTS

| | | |
|---|---|---|
| WO | WO 87/00836 | 2/1987 |
| WO | WO 90/10441 | 9/1990 |
| WO | WO 91/15368 | 10/1991 |
| WO | WO 97/30103 | 8/1997 |
| WO | WO 99/01143 | 1/1999 |
| WO | 99/07744 A1 | 2/1999 |
| WO | WO 00/69925 | 11/2000 |
| WO | WO 01/49268 | 7/2001 |
| WO | WO 01/72280 | 10/2001 |
| WO | 01/87986 A1 | 11/2001 |
| WO | WO 02/102864 | 12/2002 |
| WO | WO 03/020818 | 3/2003 |
| WO | WO 03/097759 | 11/2003 |
| WO | WO 2006/031358 | 11/2003 |
| WO | WO 2006/042161 | 4/2006 |
| WO | WO 2006/080523 | 8/2006 |
| WO | WO 2006/086510 | 8/2006 |
| WO | WO 2008/005207 | 1/2008 |
| WO | WO 2008/066787 | 6/2008 |
| WO | WO 2009/064977 | 5/2009 |
| WO | 2010/111570 A1 | 9/2010 |

OTHER PUBLICATIONS

Harris, J. Milton, "Laboratory Synthesis of Polyethylene Glycol Derivatives", JMS—Rev., Macromol. Chem. Phys., C25 (3), 1985, pp. 325-373.

Harris, J. Milton, et al., "Synthesis of New Poly(Ethylene Glycol) Derivatives", PolyEthylene Glycol Chemistry: Biotechnical and Biomedical Applications, edited by Milton J. Harris, Plenum Press: New York, 1992, pp. 371-381.

Chen, Nicole, et al., "Mechanisms of Aldehyde-Containing Paper Wet-Strength Resins", Industrial & Engineering Chemistry Research, vol. 41, No. 22, 2002, pp. 5366-5371.

Callant, Dominique, et al., "A New Approach to Dextran Derivatives with Pendent Aldehyde Groups", Reactive Polymers, vol. 8 , 1988, pp. 129-136.

Hollander, Andreas, et al., "Polymer Surface Chemistry for Biologically Active Materials", Applied Surface Science, vol. 235, 2004, pp. 145-150.

Stone, H. Harlan, et al., "Antibiotic Prophylaxis in Gastric, Biliary and Colonic Surgery", Ann. Surg; Oct. 1976, pp. 443-450.

Fishman, Alexander, et al., "Synthesis and Investigation of Novel Branched Peg-Based Soluble Polymer Supports", the Journal of Organic Chemistry, vol. 68, 2003, pp. 9843-9846.

Newkome, George R., "Improved Synthesis of an Ethereal Tetraamine Core for Dendrimer Construction", The Journal of Organic Chemistry, vol. 67, 2002, pp. 3957-3960.

Halabi, A., et al., "Synthesis and Characterization of a Novel Dendritic Acrylic Monomer", The Journal of Organic Chemistry, vol. 65, 2000, pp. 9210-9213.

Harris, J. Milton, et al., "Synthesis and Characterization of Poly(ethylene Glycol) Derivatives", Journal of Polymer Science: Polymer Chemistry Edition, vol. 22, 1984, pp. 341-352.

Merrill, Edward W., "Poly(ethylene oxide) Star Molecules: Synthesis, Characterization, and Applications in Medicine and Biology", Journal of Biomaterials Science Polymer Edition, vol. 5, No. 1/2, 1993, pp. 1-11.

Zhao, Xuan, et al., "Novel Degradable Poly(ethylene glycol) Esters for Drug Delivery", Poly(ethylene glycol) Chemistry and Biological Applications, Oxford University Press, 1998, Chapter 28, pp. 458-472.

Azzam, Tony, et al., "Cationic Polysaccharides for Gene Delivery", Macromolecules, vol. 35, No. 27, 2002, pp. 9947-9953.

Nagasaki, Yukio, et al., "Formyl-Ended Heterobifunctional Poly(ethylene oxide): Synthesis of Poly(ethylene oxide) with a Formyl Group at One End and a Hydroxyl Group at the Other End", Bioconjugate Chemistry, vol. 6, No. 2, 1995, pp. 231-233.

Greenwald, Richard B., et al., "Drug Delivery Systems Employing 1,4- or 1,6-Elimination: Poly(ethylene glycol).Prodrugs of Amine-Containing Compounds", Journal of Medicinal Chemistry, vol. 42, No. 18, 1999, pp. 3657-3667.

Zalipsky, Samuel, et al., "Preparation and Applications of Polyethylene Glycol—Polystyrene Graft Resin Supports for Solid-Phase Peptide Synthesis", Reactive Polymers, vol. 22, 1994, pp. 243-258.

Lara, V.S., et al., "Dentin-Induced In Vivo Inflammatory Response and In Vitro Activation of Murine Macrophages", Journal of Dental Research, vol. 82, No. 6, 2003, pp. 460-465.

Atassi, M.Z., "Immunochemistry of Proteins", vol. 1, Plenum Press, New York, 1977, pp. 59-60.

Sweeney, Thomas, et al., "Intestinal Anastomoses Detected with a Photopolymerized Hydrogel", Surgery, vol. 131, No. 2, Feb. 2002, pp. 185-189.

Kim, Jae Chan, et al., "Evaluation of Tissue Adhesives in Closure of Scleral Tunnel Incisions", Journal of Cataract & Refractive Surgery, vol. 21, May 1995, pp. 320-325.

Sarayba, Melvin A., et al., "Inflow of Ocular Surface Fluid Through Clear Corneal Cataract Incisions: A Laboratory Model", American Journal of Ophthalmology, vol. 138, No. 2, Aug. 2004, pp. 206-210.

Buckmann, Andreas F., et al., "Functionalization of Poly(ethylene glycol) and Monomethoxy-Poly(ethylene glycol)", Makromolecular Chemistry, vol. 182, 1981, pp. 1379 -1384.

Bruce, J., et al., "Systematic Review of the Definition and Measurement of Anastomotic Leak after Gastrointestinal Surgery", British Journal of Surgery, vol. 88, 2001, pp. 1157-1168.

Mo, Xiumei, et al "Soft Tissue Adhesive Composed of Modified Gelatin and Polysaccharides", Journal of Biomaterials Science Polymer Edition, vol. 11, No. 4, 2000, pp. 341-351.

(56) References Cited

OTHER PUBLICATIONS

Hofreiter, B.T., et al., "Rapid Estimation of Dialdehyde Content of Periodate Oxystarch through Quantitative Alkali Consumption", Analytical Chemistry, vol. 27, No. 12, Dec. 1955, pp. 1930-1931.

Zhao, Huiru, et al., "Determination of Degree of Substitution of Formyl Groups in Polyaldehyde Dextran by the Hydroxylamine Hydrochloride Method", Pharmaceutical Research, vol. 8, No. 3, 1991, pp. 400-402.

Kurisawa, Motoichi, et al., "Double-Stimuli-Responsive Degradation of Hydrogels Consisting of Oligopeptide-Terminated Poly(ethylene glycol) and Dextran with an Interpenetrating Polymer Network", Journal of Biomaterials Science Polymer Edition, vol. 8, No. 9, 1997, pp. 691-708.

Pfannemuller, B., et al., "Chemical Modification of the Surface of the Starch Granules", Starch/Starke, vol. 95, No. 9, 1983, pp. 298-303.

International Search Report, PCT/US2010/040702, Dated: Sep. 29, 2010.

ALDEHYDE-FUNCTIONALIZED POLYSACCHARIDES

CROSS-REFERENCE TO RELATED APPLICATIONS

This application is a continuation in part of U.S. patent application Ser. No. 12/996,477, filed Dec. 6, 2010, which claims priority under 35 U.S.C. §119 from U.S. Provisional Application Ser. No. 61/222,725 filed on Jul. 2, 2009.

FIELD OF THE INVENTION

The invention relates to the field of medical adhesives and sealants. More specifically, the invention relates to novel aldehyde-functionalized polysaccharides containing pendant dialdehyde groups that are useful for forming hydrogel tissue adhesives and sealants for medical use.

BACKGROUND OF THE INVENTION

Tissue adhesives and sealants have many potential medical applications, including wound closure, supplementing or replacing sutures or staples in internal surgical procedures, preventing leakage of fluids such as blood, bile, gastrointestinal fluid and cerebrospinal fluid, adhesion of synthetic onlays or inlays to the cornea, drug delivery devices, and as anti-adhesion barriers to prevent post-surgical adhesions. Conventional tissue adhesives are generally not suitable for a wide range of adhesive applications. For example, cyanoacrylate-based adhesives have been used for topical wound closure, but the release of toxic degradation products limits their use for internal applications. Fibrin-based adhesives are slow curing, have poor mechanical strength, and pose a risk of viral infection. Additionally, fibrin-based adhesives do not bond covalently to the underlying tissue.

Several types of hydrogel tissue adhesives have been developed, which have improved adhesive and cohesive properties and are nontoxic. These hydrogels are generally formed by reacting a component having nucleophilic groups with a component having electrophilic groups that are capable of reacting with the nucleophilic groups of the first component, to form a crosslinked network via covalent bonding. A number of these hydrogel tissue adhesives are prepared using an oxidized polysaccharide containing aldehyde groups as one of the reactive components (see for example, Kodokian et al., copending and commonly owned U.S. Patent Application Publication No. 2006/0078536, Goldmann, U.S. Patent Application Publication No. 2005/0002893, and Nakajima et al., U.S. Patent Application Publication No. 2008/0319101). However, the instability of oxidized polysaccharides in aqueous solution limits their shelf-life for commercial use.

Gallant et al. (*Reactive Polymers, Ion Exchangers, Sorbents* 8(2):129-136, 1988) describes soluble dextran derivatives containing aldehyde side groups that are prepared by reacting a 4-nitrophenyl carbonate ester of dextran with 2,3-dihydroxypropylamine and subsequent selective periodate oxidation of the pendant diol groups. However, the resulting dextran aldehydes were unstable when heated in mildly acidic media, undergoing aldol reactions.

Therefore, the need exists for polysaccharides containing aldehyde groups, which are more stable in aqueous solution than oxidized polysaccharides, for use in forming hydrogel tissue adhesives and sealants for medical use.

SUMMARY OF THE INVENTION

The present invention addresses the above need by providing aldehyde-functionalized polysaccharides containing pendant dialdehyde groups that are more stable in aqueous solution than oxidized polysaccharides and may be reacted with various amine-containing polymers to form hydrogel tissue adhesives and sealants, which have desirable properties for medical applications.

Accordingly, in one embodiment the invention provides a composition comprising at least one aldehyde-functionalized polysaccharide containing pendant dialdehyde groups, said aldehyde-functionalized polysaccharide having a weight-average molecular weight of about 1,000 to about 1,000,000 Daltons and a degree of aldehyde substitution of about 5% to about 100%;
wherein:
(i) each pendant dialdehyde group is attached to the polysaccharide through a linking group comprising carbon, hydrogen, and oxygen atoms;
(ii) said linking group is attached to the polysaccharide by an ether or an ester linkage;
(iii) said linking group does not contain an aromatic ring;
(iv) said pendant dialdehyde groups comprise two aldehyde functionalities separated by 2 to 4 atoms; and
(v) said two aldehyde functionalities are not bound to two adjacent carbon atoms that are bound together by a carbon-carbon double bond.

DETAILED DESCRIPTION

As used above and throughout the description of the invention, the following terms, unless otherwise indicated, shall be defined as follows:

The term "pendant dialdehyde group" as used herein when referring to aldehyde functionalized polysaccharides, refers to a chemical group which contains two aldehyde functionalities and which is attached to the carbohydrate of the polysaccharide via one of the ring hydroxyl groups.

The term "ether linkage" refers to a chemical linkage of two substituted or unsubstituted alkyl or aryl groups through an oxygen atom, (i.e., R—O—R').

The term "ester linkage" refers to a chemical linkage of substituted or unsubstituted alkyl or aryl groups through an ester group, i.e.,

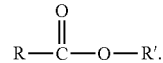

The term "degree of aldehyde substitution" refers to the mole percent of pendant aldehyde groups per mole of carbohydrate repeat units, i.e., (moles of pendant aldehyde groups/moles of carbohydrate repeat units)×100.

The term "water-dispersible, multi-arm polyether amine" refers to a polyether having three or more polymer chains ("arms"), which may be linear or branched, emanating from a central structure, which may be a single atom, a core molecule, or a polymer backbone, wherein at least three of the branches ("arms") are terminated by a primary amine group. The water-dispersible, multi-arm polyether amine is water soluble or is able to be dispersed in water to form a colloidal suspension capable of reacting with a second reactant in aqueous solution or dispersion.

The term "dispersion" as used herein, refers to a colloidal suspension capable of reacting with a second reactant in an aqueous medium.

The term "polyether" refers to a polymer having the repeat unit [—O—R]—, wherein R is a hydrocarbylene group having 2 to 5 carbon atoms. The polyether may also be a random or block copolymer comprising different repeat units which contain different R groups.

The term "hydrocarbylene group" refers to a divalent group formed by removing two hydrogen atoms, one from each of two different carbon atoms, from a hydrocarbon.

The term "primary amine" refers to a neutral amino group having two free hydrogens. The amino group may be bound to a primary, secondary or tertiary carbon.

The term "crosslink" refers to a bond or chain of atoms attached between and linking two different polymer chains.

The term "% by weight", also referred to herein as "wt %" refers to the weight percent relative to the total weight of the solution or dispersion, unless otherwise specified.

The term "anatomical site" refers to any external or internal part of the body of humans or animals.

The term "tissue" refers to any biological tissue, both living and dead, in humans or animals.

The term "hydrogel" refers to a water-swellable polymeric matrix, consisting of a three-dimensional network of macromolecules held together by covalent crosslinks that can absorb a substantial amount of water to form an elastic gel.

The term "PEG" as used herein refers to poly(ethylene glycol).

The term "$M_w$" as used herein refers to the weight-average molecular weight.

The term "$M_n$" as used herein refers to the number-average molecular weight.

The term "$M_z$" as used herein refers to the z-average molecular weight.

The term "medical application" refers to medical applications as related to humans and animals.

The meaning of abbreviations used is as follows: "min" means minute(s), "h" means hour(s), "sec" means second(s), "d" means day(s), "mL" means milliliter(s), "L" means liter(s), "μL" means microliter(s), "cm" means centimeter(s), "mm" means millimeter(s), "μm" means micrometer(s), "mol" means mole(s), "mmol" means millimole(s), "g" means gram(s), "mg" means milligram(s), "mol %" means mole percent, "Vol" means volume, "w/w" means weight per weight, "Da" means Daltons, "kDa" means kiloDaltons, the designation "10K" means that a polymer molecule possesses a number-average molecular weight of 10 kiloDaltons, "M" means molarity, "Pa" means pascal(s), "kPa" means kilopascal(s), "psi" means pounds per square inch, "rpm" means revolutions per minute", "$^1$H NMR" means proton nuclear magnetic resonance spectroscopy, "13-C NMR" means carbon 13 nuclear magnetic resonance spectroscopy, "ppm" means parts per million, "cP" means centipoise, PBS" means phosphate-buffered saline, "MWCO" means molecular weight cut off.

A reference to "Aldrich" or a reference to "Sigma" means the said chemical or ingredient was obtained from Sigma-Aldrich, St. Louis, Mo.

Disclosed herein are aldehyde-functionalized polysaccharides containing pendant dialdehyde groups. The aldehyde-functionalized polysaccharides may be reacted with various amine-containing polymers to form hydrogel tissue adhesives and sealants, which have desirable properties for medical applications. The aldehyde-functionalized polysaccharides are more stable in aqueous solution than are oxidized polysaccharides, thereby, making their use more practical for commercial purposes. The hydrogel tissue adhesives and sealants prepared using the aldehyde-functionalized polysaccharides may be useful for medical and veterinary applications, including, but not limited to, wound closure, supplementing or replacing sutures or staples in internal surgical procedures such as intestinal anastomosis and vascular anastomosis, tissue repair, preventing leakage of fluids such as blood, bile, gastrointestinal fluid and cerebrospinal fluid, ophthalmic procedures, drug delivery, and preventing post-surgical adhesions.

Aldehyde-Functionalized Polysaccharides

The aldehyde-functionalized polysaccharides disclosed herein are polysaccharides that have been chemically modified to introduce pendant dialdehyde groups into the molecule. It's been found that aldehyde-functionalized polysaccharides having pendant single aldehyde groups are more stable in aqueous solution than oxidized polysaccharides in which the ring structures of the polysaccharide are altered. It's believed that aldehyde-functionalized polysaccharides having pendant dialdehyde groups would be more stable as well because the ring structures of these polysaccharide are not altered.

Each pendant dialdehyde group of the aldehyde-functionalized polysaccharides disclosed herein is attached to the polysaccharide through a linking group. In one embodiment, the linking group comprises carbon, hydrogen, and oxygen atoms, but does not contain a nitrogen atom. In another embodiment, the linking group comprises carbon, hydrogen, oxygen, and nitrogen atoms. Additionally, the linking group does not contain an aromatic ring. The two aldehyde functionalities of the dialdehyde groups are separated by 2 to 4 atoms, more particularly, 2 to 3 atoms, so that the two aldehydes can form a bifunctional adduct with a single primary amine group of an amine-containing compound, resulting in a stable 5 to 7 member ring structure. The proximity of the dialdehyde enables rapid crosslinking of the polysaccharide with amine containing compounds, and it is believed that the formation of the ring structure comprising the two aldehydes and the primary amine results in a stronger complex than a single aldehyde-amine interaction, and therefore, a more stable hydrogel. Additionally, the two aldehyde functionalities are not bound to two adjacent carbon atoms that are bound together by a carbon-carbon double bond. It is believed that these α-β unsaturated dialdehydes would be unstable, particularly to light.

In one embodiment, the linking group is attached to the polysaccharide by an ether linkage. In another embodiment, the linking group is attached to the polysaccharide by an ester linkage. When the aldehyde-functionalized polysaccharide having a linking group attached by an ester linkage is reacted with an amine-containing compound, the resulting hydrogel degrades more rapidly than a hydrogel formed using an aldehyde-functionalized polysaccharide having a linking group attached by an ether linkage. A faster degradation may be desirable for some applications, for example adhesion prevention. Ideally, an adhesion prevention composition should not persist at the site once the healing process has begun, typically not longer than 1 to 3 weeks.

In one embodiment, the linking group is linked to the polysaccharide through an alkoxy group that is alpha to one aldehyde of the pendant dialdehyde group (i.e., on an adjacent carbon atom). In another embodiment, the linking group does not contain an alkoxy group beta to one aldehyde of the pendant dialdehyde group (i.e., on the second carbon atom from the aldehyde group). In still other embodiments the linking alkoxide is three or more atoms removed from one aldehyde of the pendant dialdehyde group.

As used herein, aldehyde-functionalized polysaccharides do not include polysaccharides that are oxidized by cleavage of the polysaccharide rings to introduce aldehyde groups. Oxidation of the polysaccharide rings results in dialdehydes formed by opening the rings of the polysaccharide. Therefore, the dialdehyde groups formed by oxidation of polysaccharide rings are not pendant dialdehyde groups as defined herein.

Aldehyde-functionalized polysaccharides may be prepared by chemically modifying a polysaccharide to introduce pendant dialdehyde groups. Useful aldehyde-functionalized polysaccharides include, but are not limited to, aldehyde-functionalized derivatives of: dextran, carboxymethyldextran, starch, agar, cellulose, hydroxyethylcellulose, carboxymethylcellulose, pullulan, inulin, levan, and hyaluronic acid. The starting polysaccharides are available commercially from sources such as Sigma Chemical Co. (St. Louis, Mo.). Typically, polysaccharides are a heterogeneous mixture having a distribution of different molecular weights, and are characterized by an average molecular weight, for example, the weight-average molecular weight ($M_w$), or the number average molecular weight ($M_n$), as is known in the art. Therefore, the aldehyde-functionalized polysaccharides prepared from these polysaccharides are also a heterogeneous mixture having a distribution of different molecular weights. Suitable aldehyde-functionalized polysaccharides have a weight-average molecular weight of about 1,000 to about 1,000,000 Daltons, more particularly about 3,000 to about 250,000 Daltons, more particularly about 5,000 to about 60,000 Daltons, and more particularly about 7,000 to about 20,000 Daltons. In one embodiment, the aldehyde-functionalized polysaccharide is aldehyde-functionalized dextran. In another embodiment, the aldehyde-functionalized polysaccharide is aldehyde-functionalized inulin.

Aldehyde-functionalized polysaccharides having dialdehyde functional groups can be prepared by first attaching a pendant group containing either a diene or by attaching a cyclic, disubstituted olefin to the polysaccharide ring. Attachment of the pendant groups can be accomplished using a variety of methods, including reaction of the polysaccharide with glycidyl ethers containing cyclic olefins or dienes, or reaction with carboxylic acids or derivatives thereof which also contain cyclic olefins or dienes. Oxidation of the polysaccharides derivatized with cyclic olefins or dienes using methods known in the art, such as ozonolysis, yield polysaccharides derivatized with pendant dialdehydes.

The degree of aldehyde substitution may be determined using methods known in the art. For example, the degree of aldehyde substitution may be determined by titrating the aldehyde-functionalized polysaccharide with hydroxylamine hydrochloride according to the method of Zhao and Heindel (*Pharmaceutical Research* 8:400, 1991). Suitable aldehyde-functionalized polysaccharides have a degree of aldehyde substitution of about 5% to about 100%.

Hydrogel Tissue Adhesives and Sealants

The aldehyde-functionalized polysaccharides described above may be used in combination with various amine-containing polymers to prepare hydrogel tissue adhesives and sealants for medical and veterinary applications, including, but not limited to, wound closure, supplementing or replacing sutures or staples in internal surgical procedures such as intestinal anastomosis and vascular anastomosis, tissue repair, preventing leakage of fluids such as blood, bile, gastrointestinal fluid and cerebrospinal fluid, ophthalmic procedures, drug delivery, and preventing post-surgical adhesions. For example, an aldehyde-functionalized polysaccharide may be used in place of an oxidized polysaccharide to react with a multi-arm polyether amine (Kodokian et al., copending and commonly owned U.S. Patent Application Publication No. 2006/0078536), as described in detail in the Examples herein below. Alternatively, an aldehyde-functionalized polysaccharide may be used in place of an oxidized polysaccharide to react with a polymer having amino groups such as chitosan or a modified polyvinyl alcohol having amino groups (Goldmann, U.S. Patent Application Publication No. 2005/000289), or with an amino group containing polymer such as poly L-lysine (Nakajima et al., U.S. Patent Application Publication No. 2008/0319101).

The aldehyde-functionalized polysaccharides may be used in various forms to prepare a hydrogel tissue adhesive and sealant. In one embodiment, the aldehyde-functionalized polysaccharide is used in the form of aqueous solution or dispersion. To prepare an aqueous solution or dispersion comprising an aldehyde-functionalized polysaccharide, at least one aldehyde-functionalized polysaccharide is added to water to give a concentration of about 5% to about 50%, and more particularly from about 10% to about 50% by weight relative to the total weight of the solution or dispersion. Additionally, a mixture of at least two different aldehyde-functionalized polysaccharides having different weight-average molecular weights, different degrees of aldehyde substitution (i.e., different equivalent weights per aldehyde group), or both different weight-average molecular weights and degrees of aldehyde substitution may be used. Additionally, a mixture comprising at least one aldehyde-functionalized polysaccharide having pendant dialdehyde groups and at least one aldehyde-functionalized polysaccharide having pendant single aldehyde groups may be used. Aldehyde-functionalized polysaccharides having pendant single aldehyde groups may be prepared using methods known in the art (e.g., Mehta et al., WO 99/07744, Chen, *Biotechnology Techniques* 3:131-134, 1989, and Solarek et al., U.S. Pat. No. 4,703,116). Where a mixture of aldehyde-functionalized polysaccharides is used, the total concentration of the aldehyde-functionalized polysaccharides is about 5% to about 50% by weight, and more particularly from about 10% to about 50% by weight relative to the total weight of the solution or dispersion.

For use as a component to prepare a hydrogel tissue adhesive or sealant, it is preferred that the aqueous solution or dispersion comprising the aldehyde-functionalized polysaccharide be sterilized to prevent infection. Any suitable sterilization method known in the art that does not adversely affect the ability of the aldehyde-functionalized polysaccharide to react to form an effective hydrogel may be used, including, but not limited to, electron beam irradiation, gamma irradiation, ethylene oxide sterilization, or filtration through a 0.2 μm pore membrane.

The aqueous solution or dispersion comprising the aldehyde-functionalized polysaccharide may further comprise various additives depending on the intended application. Preferably, the additive does not interfere with effective gelation to form a hydrogel. The amount of the additive used depends on the particular application and may be readily determined by one skilled in the art using routine experimentation. For example, the aqueous solution or dispersion comprising the aldehyde-functionalized polysaccharide may comprise at least one additive selected from pH modifiers, viscosity modifiers, anti-oxidants, stabilizers, antimicrobials, colorants, surfactants, additives that increase or decrease the rate of degradation of the hydrogel tissue adhesive or sealant, pharmaceutical drugs and therapeutic agents.

The aqueous solution or dispersion comprising the aldehyde-functionalized polysaccharide may optionally include at least one pH modifier to adjust the pH of the solution or dispersion. Suitable pH modifiers are well known in the art. The pH modifier may be an acidic or basic compound. Examples of acidic pH modifiers include, but are not limited to, carboxylic acids, inorganic acids, and sulfonic acids. Examples of basic pH modifiers include, but are not limited to, hydroxides, alkoxides, carboxylates, nitrogen-containing compounds other than primary and secondary amines, and basic carbonates and phosphates.

The aqueous solution or dispersion comprising the aldehyde-functionalized polysaccharide may optionally include at least one antimicrobial agent. Suitable antimicrobial preservatives are well known in the art. Examples of suitable antimicrobials include, but are not limited to, alkyl parabens, such as methylparaben, ethylparaben, propylparaben, and butylparaben; triclosan; chlorhexidine; cresol; chlorocresol; hydroquinone; sodium benzoate and potassium benzoate; polyhexamethylene biguanide; antibiotics effective against bacteria, including aminoglycoside antibiotics such as gentamicin, streptomycin, amikacin and kanamycin, a cephalosporin such as cephalexin and cephtriaxone, a carbacephem such as loracarbef, a glycopeptide such as vancomycin, a macrolide such as erythromycin and rifampicin, a penicillin such as amoxicillin and ampicillin, a polypeptide such as bacitracin and polymyxin B, a quinolone such as ciprofloxacin, levofloxacin and moxifloxacin, a tetracycline such as oxytetracycline and doxycycline, and a sulfonamide; antifungals such as ketoconazole, miconazole and amphotericin B; antivirals such as acyclovir or AZT; antihelmintics; and antiprotozoals.

The aqueous solution or dispersion comprising the aldehyde-functionalized polysaccharide may optionally include at least one colorant to enhance the visibility of the solution. Suitable colorants include dyes, pigments, and natural coloring agents. Examples of suitable colorants include, but are not limited to, FD&C and D&C colorants, such as FD&C Violet No. 2, FD&C Blue No. 1, D&C Green No. 6, D&C Green No. 5, D&C Violet No. 2; and natural colorants such as beetroot red, canthaxanthin, chlorophyll, eosin, saffron, and carmine.

The aqueous solution or dispersion comprising the aldehyde-functionalized polysaccharide may optionally include at least one surfactant. Surfactant, as used herein, refers to a compound that lowers the surface tension of water. The surfactant may be an ionic surfactant, such as sodium lauryl sulfate, or a neutral surfactant, such as polyoxyethylene ethers, polyoxyethylene esters, and polyoxyethylene sorbitan.

Additionally, the aqueous solution or dispersion comprising the aldehyde-functionalized polysaccharide may optionally include at least one pharmaceutical drug or therapeutic agent. Suitable drugs and therapeutic agents are well known in the art (for example see the United States Pharmacopeia (USP), Physician's Desk Reference (Thomson Publishing), The Merck Manual of Diagnosis and Therapy 18th ed., Mark H. Beers and Robert Berkow (eds.), Merck Publishing Group, 2006; or, in the case of animals, The Merck Veterinary Manual, 9th ed., Kahn, C. A. (ed.), Merck Publishing Group, 2005). Nonlimiting examples include, but are not limited to, anti-inflammatory agents, for example, glucocorticoids such as prednisone, dexamethasone, budesonide; non-steroidal anti-inflammatory agents such as indomethacin, salicylic acid acetate, ibuprofen, sulindac, piroxicam, and naproxen; fibrinolytic agents such as a tissue plasminogen activator and streptokinase; anti-coagulants such as heparin, hirudin, ancrod, dicumarol, sincumar, iloprost, L-arginine, dipyramidole and other platelet function inhibitors; antibodies; nucleic acids; peptides; hormones; growth factors; cytokines; chemokines; clotting factors; endogenous clotting inhibitors; antibacterial agents; antiviral agents; antifungal agents; anti-cancer agents; cell adhesion inhibitors; healing promoters; vaccines; thrombogenic agents, such as thrombin, fibrinogen, homocysteine, and estramustine; radio-opaque compounds, such as barium sulfate and gold particles and radiolabels.

EXAMPLES

The present invention is further defined in the following Examples. It should be understood that these Examples, while indicating preferred embodiments of the invention, are given by way of illustration only. From the above discussion and these Examples, one skilled in the art can ascertain the essential characteristics of this invention, and without departing from the spirit and scope thereof, can make various changes and modifications of the invention to adapt it to various uses and conditions.

Reagent Preparation

Preparation of Eight-Arm PEG 10K Octaamine (P8-10-1):

Eight-arm PEG 10K octaamine ($M_n$=10 kDa) is synthesized using the two-step procedure described by Chenault in co-pending and commonly owned U.S. Patent Application Publication No. 2007/0249870. In the first step, the 8-arm PEG 10K chloride is made by reaction of thionyl chloride with the 8-arm PEG 10K octaalcohol. In the second step, the 8-arm PEG 10K chloride is reacted with aqueous ammonia to yield the 8-arm PEG 10K octaamine. A typical procedure is described here.

The 8-arm PEG 10K octaalcohol ($M_n$=10000; NOF Sun-Bright HGEO-10000), (100 g in a 500-mL round-bottom flask) is dried either by heating with stirring at 85° C. under vacuum (0.06 mm of mercury (8.0 Pa)) for 4 hours or by azeotropic distillation with 50 g of toluene under reduced pressure (2 kPa) with a pot temperature of 60° C. The 8-arm PEG 10K octaalcohol is allowed to cool to room temperature and thionyl chloride (35 mL, 0.48 mol) is added to the flask, which is equipped with a reflux condenser, and the mixture is heated at 85° C. with stirring under a blanket of nitrogen for 24 hours. Excess thionyl chloride is removed by rotary evaporation (bath temp 40° C.). Two successive 50-mL portions of toluene are added and evaporated under reduced pressure (2 kPa, bath temperature 60° C.) to complete the removal of thionyl chloride. Proton NMR results from one synthesis are:

$^1$H NMR (500 MHz, DMSO-d6) δ 3.71-3.69 (m, 16H), 3.67-3.65 (m, 16H), 3.50 (s, ~800H).

The 8-arm PEG 10K octachloride (100 g) is dissolved in 640 mL of concentrated aqueous ammonia (28 wt %) and heated in a pressure vessel at 60° C. for 48 hours. The solution is sparged for 1-2 hours with dry nitrogen to drive off 50 to 70 g of ammonia. The solution is then passed through a column (500 mL bed volume) of strongly basic anion exchange resin (Purolite® A-860, The Purolite Co., Bala-Cynwyd, Pa.) in the hydroxide form. The eluant is collected and three 250-mL portions of de-ionized water are passed through the column and also collected. The aqueous solutions are combined, concentrated under reduced pressure (2 kPa, bath temperature 60° C.) to about 200 g, frozen in portions and lyophilized to give the 8-arm PEG 10K octaamine, referred to herein as P8-10-1, as a colorless waxy solid.

Example 1

Preparation of Dextran Having Pendant Dialdehyde Groups (DAFD-10-16)

Dialdehyde-functionalized dextran in which the pendant dialdehyde groups are linked to the dextran backbone by an ether bond was prepared using a three step procedure.

Step 1:

To a 300 mL, two-neck flask equipped with a magnetic stir bar and nitrogen inlet was added 74.3 mL of a 40 wt % sodium hydroxide solution and 0.94 g (2.91 mmol) of tetrabutylammonium bromide. The solution was cooled to 5-10° C. and treated with 5.0 g (59.44 mmol) of 3-cyclopentene-1-ol followed by dropwise addition of epichlorohydrin 22.0 g (237.76 mmol) over a 20 min period. The reaction mixture was stirred at room temperature overnight. Then, the reaction mixture was poured onto approximately 50 mL of ice/water and stirred to give a solution, which was extracted three times with 50 mL portions of diethyl ether. The combined organic layers were washed with brine solution until neutral to litmus and dried over $MgSO_4$. The solvent was removed on a rotary evaporator to yield a brown liquid. The crude product was purified by distillation. The product was collected at 118° C. and 25 mm Hg (3.3 kPa).

$^1$H NMR in $CDCl_3$ δ ppm (2.42, m, 2H, 2.5, m 1H, 2.6, m, 2H, 2.78, m, 1H, 3.15, m, 1H, 3.4, m, 1H, 3.65-3.68, m, 1H, 4.26, m, 1H, 5.68 s, 2H)

Step 2:

Into a 10 mL, 2-neck flask equipped with a magnetic stir bar and reflux condenser with nitrogen inlet was placed 0.58 mL of water followed by 0.5778 g (3.567 mmol) of dextran having a weight-average molecular weight of about 9 to about 11 kDa. The solution was stirred to form a suspension. To the flask was added 0.75 mL of 20 wt % NaOH solution. After stirring for 30 min, 1.0 g (7.134 mmol) of glycidyl 3-cyclopentenyl ether was added. The solution was heated in an oil bath at 65° C. for 5.5 hours. Then, the reaction mixture was cooled to room temperature and the pH was adjusted to 7.0 with 0.5 M HCl. The resulting solution was diluted to approximately 400 mL with water, then purified using the Millipore Pellicon II ultrafiltration system with a 1000 molecular weight cutoff cassette. A small aliquot was lyophilized for analysis.

$^1$H NMR was obtained in $D_2O$. δ ppm (2.2, d; 2.4, d; 3.31-3.7, m; 4.1, s; 4.77, s; 4.9, s(b); 5.55, s)

The remainder of the solution was treated with ozone to make functionalized dextran. From NMR, the degree of substitution was determined by integration of the anomeric peaks at 5.0-5.2 ppm vs. the olefinic peaks. The degree of substitution was found to be 0.52.

Step 3:

A 1 L, 3-neck flask containing 400 mL of the aqueous solution of functionalized dextran (from the previous step) at approximately 8° C. was sparged with ozone for 5.5 hours. The ozone flow was stopped and a solution of 0.45 g of sodium sulfite in 3 mL of water was added to the flask at 8° C. The solution was stirred overnight and purified by ultrafiltration on the Millipore Pellicon II ultrafiltration system using 1000 MWCO cassette. The final solution was frozen and lyophilized to yield 0.68 g of a foam-like solid.

$^1$H NMR was obtained in $D_2O$. δ ppm (1.318, m; 1.523, m; 1.8, m; 2.1, m; 2.3-2.48, m; 3.3-3.9, m; 4.9, s; 5.1, s(b); 5.5, s)

The degree of aldehyde substitution was determined to be about 16% by titration of the hydroxylamine adduct of the dialdehyde-functionalized dextran using the method described by Zhao and Heindel (*Pharmaceutical Research* 8:400, 1991). This dialdehyde-functionalized dextran is referred to herein as DAFD-10-16.

Example 2

Preparation of Dextran Having Pendant Dialdehyde Groups (DAFD-Ester Linked)

Dialdehyde-functionalized dextran in which the pendant dialdehyde groups are linked to the dextran backbone by an ester bond was prepared using a two step procedure.

Step 1:

Into a 50 mL, 3-neck flask equipped with magnetic stir bar and a reflux condenser was placed 22 mL of dimethylacetamide (DMAC) followed by 1.817 g (11.217 mmol) of dextran having a weight-average molecular weight of about 9 to about 11 kDa and 1.09 g (25.71 mmol) of lithium chloride. A suspension formed, which was heated to 90° C. for one hour until a clear solution resulted. The solution was cooled to room temperature and 0.91 mL (11.217 mmol) of pyridine was added followed by dropwise addition of 2.18 g (11.217 mmol) of 3-cyclopentene carbonyl chloride. 4-Dimethylaminopyridine (DMAP, Aldrich) (30 mg) was added and the mixture was heated mixture at 60° C. overnight i.e., approximately 20 hours). After cooling, the resulting brown solution was added dropwise to 200 mL of cooled water with stirring to give a yellow solution. The pH was adjusted from 2.15 to 6.0 using a 0.25 N NaOH solution. The crude product was purified on a Millipore Pellicon II ultrafiltration system using a1000 molecular weight cutoff cassette. A small aliquot was frozen and lyophilized to obtain an analytical sample.

$^1$H NMR. δ ppm (2.59-2.66, m); (2.85, s); (3.0, s); (3.24 (b), s); (3.46-3.51, m); (3.52-3.71, m); (3.84, d); (3.93, d); (4.91, s); (4.97, s); (5.12, t); (5.68, s)

Step 2:

A 1 L, 3-neck flask equipped with a magnetic stir bar and containing 350 mL of the solution resulting from the previous step at approximately 8° C. was sparged with an ozone stream for 5 hours. After discontinuing the ozone sparge, a solution of 1.41 g of sodium sulfite in 8.4 mL water was added. The resulting mixture was stirred at room temperature overnight, then purified on a Millipore Pellicon II ultrafiltration system using a 1000 molecular weight cutoff cassette filter. The solution was frozen and lyophilized to yield 1.92 g of a white solid.

$^1$H NMR was submitted in $D_2O$. δ ppm (3.49-3.79, m); (3.89-3.97, m); (4.97 d, (broad)); 5.16 (s, (b))

This dialdehyde-functionalized dextran is referred to herein as DAFD-Ester Linked.

Example 3

In Vitro Degradation of Hydrogels Formed Using Dialdehyde-Functionalized Dextrans This Example demonstrate the higher stability of a hydrogel prepared using aldehyde-functionalized dextran having pendant dialdehyde groups where the linkage to the dextran backbone is an ether linkage, as described in Example 1, compared to a hydrogel prepared using aldehyde-functionalized dextran having pendant dialdehyde groups where the linkage to the dextran backbone is an ester linkage, as described in Example 2.

Preparation and Stability of Hydrogels

An aqueous solution containing dialdehyde-functionalized dextran DAFD-10-16, prepared as described in Example 1, or DAFD-10-Ester Linked, prepared as described in Example 2, at a concentration of 20 wt % was mixed with an aqueous solution containing multi-arm PEG amine P8-10-1 (25 wt %) using a double barrel syringe (Mixpac Systems AG (Rotkreuz, Switzerland) fitted with a 16 or a 12 step static mixer (Mixpac Systems AG) to form a hydrogel. The hydrogel was allowed to cure at room temperature for no longer than 2 min. After the hydrogels cured, the samples were weighed and placed inside jars containing PBS (phosphate buffered saline) at pH 7.4. The jars were placed inside a temperature-controlled shaker set at 80 rpm and 37° C. The samples were removed from the jars at various times, blotted to remove excess solution, and weighed. Then, the samples were returned to the jars. The results are summarized in Table 1. The percent swell reported in the table is the weight of the hydrogel measured during the course of the study divided by the initial weight of the hydrogel, multiplied by 100.

TABLE 1

In Vitro Degradation of Hydrogels

| Aldehyde-Functionalized Polysaccharide Solution | Multi-Arm PEG Amine Solution | Time (hours) | % Swell |
|---|---|---|---|
| DAFD-10-16 20 wt % | P8-10-1 25 wt % | 0 | 100 |
| | | 1 | 249 |
| | | 2 | 258 |
| | | 4 | 245 |
| | | 6 | 244 |
| | | 8 | 243 |
| | | 22 | 244 |
| | | 26 | 247 |
| DAFD-Ester Linked 20 wt % | P8-10-1 25 wt % | 0 | 100 |
| | | 1 | 236 |
| | | 2 | 45.3 |
| | | 4 | 3.6 |

These results demonstrate that hydrogels formed using aldehyde-functionalized dextran having pendant dialdehyde groups where the linkage to the dextran backbone is an ether linkage and the multi-arm PEG amine P-8-10-1 are much longer lived than hydrogels formed using aldehyde-functionalized dextran having pendant dialdehyde groups where the linkage to the dextran backbone is an ester linkage and the multi-arm PEG amine P-8-10-1. The use of either ether or ester linkages allows the preparation of hydrogels with different degradation rates, depending on the particular application.

Example 4

Preparation of Dextran Having Pendant Dialdehyde Groups—Cyclohexene Derived

Dextran having pendant dialdehyde groups was prepared using a three step procedure. First, glycidyloxycyclohexene was prepared by addition of epichlorohydrin to 2-cyclohexene-1-ol. Secondly, dextran was reacted with the glycidoxy cyclohexene to give an olefin functionalized dextran. Finally, oxidation by ozonolysis in the third step gave the dextran having pendant dialdehyde groups.

Glycidoxylation of 2-Cyclohexene-1-ol

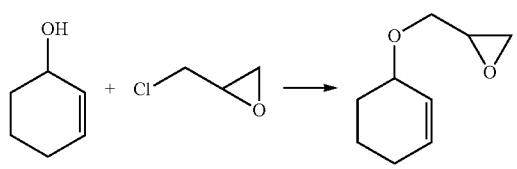 [SMILES: OC1C=CCCC1 ; ClCC1CO1 ; C1=CC(OCC2CO2)CCC1]

Into a 500-mL, 3-neck flask was added 1.7 g (0.0051 mol) of tetrabutylammonium bromide and 125 mL of 40% NaOH. The mixture was cooled to 0° C. and 9.835 g (0.1 mol) of 2-cyclohexene-1-ol was added. The resulting mixture was maintained at 0° C. while 37.1 g (0.41 mol) of epichlorohydrin was added dropwise over a time period of 30 min. After the addition was completed, the mixture was allowed to warm to room temperature and then was stirred overnight. The contents of the flask were poured into 150 mL of water with stirring. The resulting solution was extracted thee times with 150 mL portions of ether. The combined ether extracts were washed with brine until the wash showed neutral to litmus, then dried over $MgSO_4$. The ether layer was filtered to remove the drying salt and concentrated using a rotovap to give 29.13 g of an oil. The oil was distilled at 0.04 mm Hg (5.3 Pa) and the product fraction (11.78 g) was collected at 60° C.

Reaction with Dextran and Oxidation to Dialdehyde

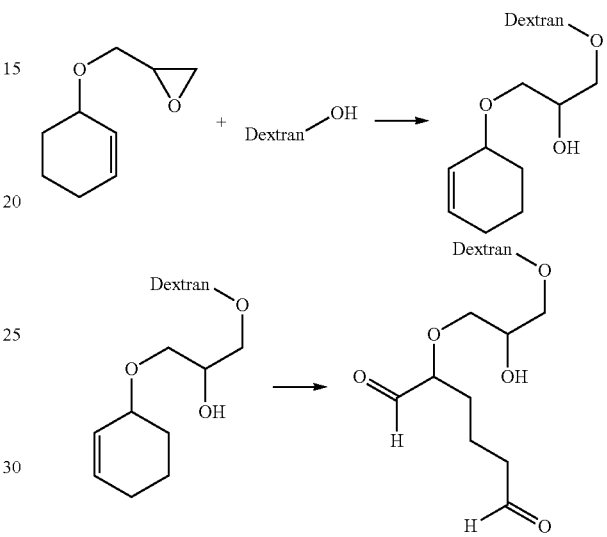

To a 100-mL round bottom flask was added 6.19 g of dextran, average molecular weight of 10 kDa, and 6.2 mL of water. The mixture was stirred with an overhead stirrer and 8.045 mL of 20% NaOH was added. To the resultant solution was added 11.78 g of glycidyloxy cyclohexene, prepared as described above. The reaction mixture was heated for 6 h at 65° C., then, cooled to room temperature, and water was added to dissolve the precipitated salts. An extra 30 mL of water was then added and the pH was adjusted to 7.0 with HCl. To the mixture was then added 800 mL of water to form a cloudy solution. The solution was purified by ultrafiltration by reducing the volume to about 60 mL, then collecting 6 times that volume in permeate while continuously adding fresh water to replace the permeate. A sample was taken and lyophilized for analysis, and the bulk was taken to the next step. Integration of NMR signals for the olefinic protons against the anomeric protons showed the degree of substitution was 143%

The solution was diluted to about 300 mL with water and ozone was bubbled through for 3.5 h. Foaming was controlled by addition of drops of heptanol as needed. A sample was taken and analyzed by NMR to determine if the reaction was completed, as evidenced by the disappearance of the olefinic resonances. The mixture was again purified by ultrafiltration, and then lyophilized to give a white powder.

Example 5

Preparation of Dextran Having Pendant Dialdehyde Groups—Cyclopentene Derived

Dextran having pendant dialdehyde groups was prepared using a two step procedure. First, dextran was reacted with glycidyloxycyclopentene to give an olefin functionalized dextran, which was oxidized by ozonolysis in the second step to give the dextran having pendant dialdehyde groups.

Reaction of Dextran with Glycidyloxycyclopentene

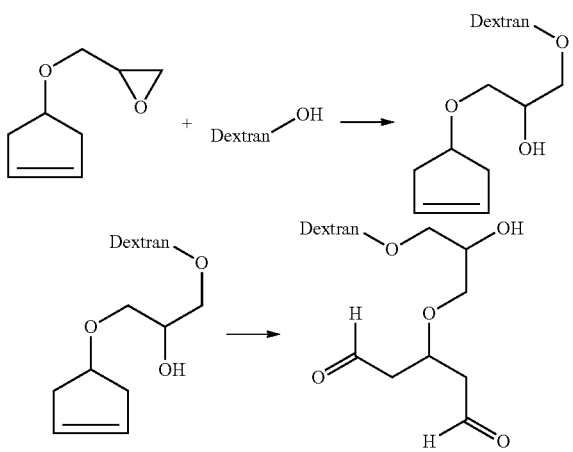

To a 100-mL, 3-neck flask with mechanical stirrer was added 8.43 g of dextran, having an average molecular weight of 10 kDa, and 8.5 mL of water. To this suspension was added 10.97 mL of 20% NaOH. After about 25 min a solution had formed and 7.3 g of glycidylcyclopentene, prepared as described in Example 1, was added. The mixture was heated at 65° C. for 6.5 h, then cooled to room temperature and added slowly to 100 mL of water. The pH was adjusted to 7.0 with 1.0 N HCl and then the mixture was purified by ultrafiltration. A sample was taken for analysis and lyophilized, and the remainder was used directly in the next step. NMR showed the desired product and that the degree of substitution was 43%.

The solution (300 mL) was sparged with ozone for 2 h. NMR analysis indicated that the reaction was completed as evidenced by the loss of olefinic resonances. The mixture was reduced by addition of 6.52 g of sodium sulfite in 39 mL of water and overnight stirring. The mixture was then purified using ultrafiltration and lyophilized to give a white powder.

Example 6

Formation of Hydrogels from Cyclohexene-Derived Dextran Dialdehyde and P8-10-1 Multi-Arm Amine This Example demonstrates the formation of hydrogels from the cyclohexene-derived dextran having pendant dialdehyde groups and the multi-arm PEG amine, P8-10-1.

Aqueous solutions were prepared of the cyclohexene-derived dextran dialdehyde, prepared as described in Example 4, at concentrations of 5%, 7.5%, 10%, and 20% by weight. An aqueous solution of P8-10-1, prepared as described in the Reagent Preparation section above, was prepared at a concentration of 50% by weight. The aqueous solution of P8-10-1 (100 µL) was added to each of four test tubes. Then, 100 µL of one of each of the dextran dialdehyde solutions was added to one of the test tubes. Upon addition of the dialdehyde solution, timing was started and the mixtures were stirred vigorously with a wooden stick. The time to the formation of a gel was recorded. The results are summarized in Table 2. As can be seen from the results in the table, a hydrogel was formed with all of the dextran dialdehyde solutions tested.

TABLE 2

Gel Times for Mixtures of Cyclohexene-Derived Dextran Dialdehyde and P8-10-1 Multi-Arm Amine

| Wt % of Cyclohexene-Derived Dextran Dialdehyde | Gel Time |
| --- | --- |
| 5 | 5 min |
| 7.5 | 33 sec |
| 10 | 16 sec |
| 20 | 4 sec |

Example 7

Formation of Hydrogel from Cyclopentene-Derived Dextran Dialdehyde and P8-10-1 Multi-Arm Amine This Example demonstrates the formation of a hydrogel from the cyclopentene-derived dextran having pendant dialdehyde groups and the multi-arm PEG amine, P8-10-1.

An aqueous solution was prepared of the cyclopentene-derived dextran dialdehyde, prepared as described in Example 5, at a concentration of 50% by weight. An aqueous solution of P8-10-1, 50 wt %, was also prepared. The P8-10-1 solution (100 µL) was added to a test tube. Then, 100 µL of the dextran dialdehyde solution was added and timing was started, while the mixture was stirred vigorously using a wooden stick. A gel formed after 5 min.

Example 8

Formation of Hydrogels from Blends of Pendant Dialdehyde and Pendant Single Aldehyde Dextrans with P8-10-1 Multi-Arm Amine This Example demonstrates the formation of hydrogels from blends of a cyclohexene-derived dextran having pendant dialdehyde groups and an aldehyde-functionalized dextran having pendant single aldehyde groups (AFD-15-90) with the multi-arm PEG amine, P8-10-1.

Preparation of AFD-15-90

Dextran containing pendant single aldehyde groups and having a weight-average molecular weight of about 15 kDa and a degree of aldehyde substitution of about 90% was prepared using a two step procedure. In the first step, dextran having a weight-average molecular weight of about 9 to about 11 kDa was reacted with allyl glycidyl ether to form an olefin intermediate, which was then reacted with ozone to form the dextran containing pendant aldehyde groups.

In the first step, 30 g of dextran (average molecular weight of 9-11 kDa, Sigma), and 30 mL of water were added into a 3-neck flask. The solution was cooled to 10° C. and then 39 mL of a 20 wt % NaOH solution was added. The resulting solution was stirred for 25 min, giving a faint yellow solution, and then 84.58 g (4 equiv) of allyl glycidyl ether (Aldrich) was added. The resulting mixture was heated to 65° C. for 5.5 hours, and then allowed to cool to room temperature, after which the pH was adjusted to 7.0 with 1 N HCl. The mixture was diluted with an additional 200 mL of water and purified using a Millipore Pellicon II ultrafiltration system (Millipore Corp., Billerica, Mass.), by filtration through 1 kDa cutoff filters with continuous replacement of filtrate with pure water until 5× the initial solution volume had been collected as filtrate. A small sample was taken and lyophilized for analytical purposes. The remainder of the filtrate was used directly in the subsequent ozonolysis step. The degree of substitution was determined to be 1.33 by proton NMR from the ratio of integration between the olefin peaks and the anomeric peaks at 4.8-5.0.

In the second step, 460 mL of the filtrate resulting from step 1 was added to a 3-neck, 2 L flask equipped with magnetic stir bar, and sparge tube inlet. The solution was cooled in an ice bath to 0-5° C. and then sparging with ozone was begun from an ozone generator (ClearWater Tech, LLC., San Luis Obispo, Calif.; Model CD10) at 100% power which generates 7% ozone. Foaming occurred, which was controlled by the addition of a few drops of 1-heptanol. Samples were taken at 6.25 and 7.75 hours and analyzed using 13-C NMR. Disappearance of resonances at 118 and 134 ppm indicated that the olefin had been consumed after 7.75 hours. Then, a solution of sodium sulfite (23.3 g in 138 mL water) was added dropwise with stirring. A slight exotherm was observed and the reaction mixture was allowed to stir overnight under nitrogen. The mixture was transferred to a 1 L glass jar and filtered through a Millipore Pellicon II ultrafiltration system with 1 kDa cutoff filters. Water was continuously added to replace the filtrate collected, and the retentate was recycled back to the glass jar. This process was continued until more than 5× the initial reaction volume had been collected in the filtrate. The purified solution was then frozen and lyophilized to give 53.9 g of a fluffy white solid. The degree of aldehyde substitution of the resulting solid product was determined to be 89% using the method of Zhao and Heindel (*Pharmaceutical Research* 8:400, 1991). The weight-average molecular weight of the aldehyde-functionalized dextran was determined to be about 15 kDa using size exclusion chromatography (SEC). This aldehyde-functionalized dextran is referred to herein as AFD-15-90.

Gel Times

An aqueous solution of the cyclohexene-derived dextran dialdehyde, prepared as described in Example 4, (20 wt %) and a 20 wt % aqueous solution of AFD-15-90 were prepared. The two solutions were blended in various amounts, as shown in Table 3, and the blended solutions were mixed with an aqueous solution of P8-10-1 (50 wt %) and the gel time was measured. The results are summarized in Table 3. As can be seen from the results in the table, hydrogels rapidly formed with all the blended aldehyde solutions.

TABLE 3

Gel Times for Blends of Aldehyde Solutions with P8-10-1

| Volume of Cyclohexene-Derived Dialdehyde (μL) | Volume of AFD-15-90 (μL) | Volume of P8-10-1 (μL) | Gel Time (sec) |
| --- | --- | --- | --- |
| 25 | 75 | 100 | 4-6 |
| 50 | 50 | 100 | 7 |
| 75 | 25 | 100 | 8 |

What is claimed is:

1. A composition comprising at least one aldehyde-functionalized polysaccharide containing pendant dialdehyde groups, said aldehyde-functionalized polysaccharide having a weight-average molecular weight of about 1,000 to about 1,000,000 Daltons and a degree of aldehyde substitution of about 5% to about 100%, wherein:
   (i) each pendant dialdehyde group is attached to the polysaccharide through a linking group comprising carbon, hydrogen, and oxygen atoms,
   (ii) said linking group is attached to the polysaccharide by an ether or an ester linkage,
   (iii) said linking group does not contain an aromatic ring,
   (iv) said pendant dialdehyde groups comprise two aldehyde functionalities separated by 2 to 4 atoms, and
   (v) said two aldehyde functionalities are not bound to two adjacent carbon atoms that are bound together by a carbon-carbon double bond.

2. The composition according to claim 1 wherein the linking group does not contain a nitrogen atom.

3. The composition according to claim 1 wherein the linking group comprises carbon, hydrogen, oxygen, and nitrogen atoms.

4. The composition according to claim 1 wherein the linking group is attached to the polysaccharide by an ether linkage.

5. The composition according to claim 1 wherein said linking group contains an alkoxy group that is alpha to one aldehyde of the pendant dialdehyde group.

6. The composition according to claim 1 wherein the aldehyde-functionalized polysaccharide is selected from the group consisting of aldehyde-functionalized derivatives of: dextran, carboxymethyldextran, starch, agar, cellulose, hydroxyethylcellulose, carboxymethylcellulose, pullulan, inulin, levan, and hyaluronic acid.

7. The composition according to claim 6 wherein the aldehyde-functionalized polysaccharide is aldehyde-functionalized dextran.

8. The composition according to claim 6 wherein the aldehyde-functionalized polysaccharide is aldehyde-functionalized inulin.

9. The composition according to claim 1 wherein the weight-average molecular weight is about 7,000 to about 20,000 Daltons.

10. The composition according to claim 1 wherein the composition is in the form of an aqueous solution or dispersion.

11. The composition according to claim 10 wherein the aqueous solution or dispersion contains the aldehyde-functionalized polysaccharide at a concentration of about 5% to about 50% by weight relative to the total weight of the solution or dispersion.

12. The composition according to claim 10 further comprising an aldehyde-functionalized polysaccharide having pendant single aldehyde groups.

\* \* \* \* \*